United States Patent
Zhu et al.

(10) Patent No.: US 9,772,453 B2
(45) Date of Patent: Sep. 26, 2017

(54) OPTICAL FIBER SOCKET AND OPTICAL FIBER PLUG

(71) Applicant: Amphenol Fiber Optic Technology (Shenzhen) Co., Ltd., Shenzhen, Guangdong Province (CN)

(72) Inventors: Ling-Hua Zhu, Shenzhen (CN); Song-Sheng Li, Shenzhen (CN); Xue-Wu Lei, Shenzhen (CN)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/218,242

(22) Filed: Jul. 25, 2016

(65) Prior Publication Data
US 2017/0242198 A1  Aug. 24, 2017

(30) Foreign Application Priority Data
Feb. 24, 2016  (TW) .............................. 105202551 U (51) Int. Cl.
*G02B 6/38* (2006.01)
(52) U.S. Cl.
CPC ......... *G02B 6/3825* (2013.01); *G02B 6/3874* (2013.01); *G02B 6/3887* (2013.01)
(58) Field of Classification Search
CPC ... G02B 6/3825; G02B 6/3874; G02B 6/3887
See application file for complete search history.

(56) References Cited

U.S. PATENT DOCUMENTS

| | | | | |
|---|---|---|---|---|
| 4,579,418 A | * | 4/1986 | Parchet | G02B 6/3831 385/60 |
| 4,820,185 A | * | 4/1989 | Moulin | H01R 13/621 385/59 |
| 6,648,520 B2 | * | 11/2003 | McDonald | G02B 6/3869 385/59 |
| 7,654,747 B2 | | 2/2010 | Theuerkorn et al. | |
| 7,726,999 B2 | * | 6/2010 | Vanzo | H01R 13/625 439/318 |
| 2005/0037656 A1 | * | 2/2005 | Cairns | G02B 6/3816 439/353 |

\* cited by examiner

*Primary Examiner* — Daniel Petkovsek
(74) *Attorney, Agent, or Firm* — Muncy, Geissler, Olds & Lowe, P.C.

(57) ABSTRACT

An optical fiber plug adapted to be connected to an optical fiber socket and a first optical fiber cable includes a plug sleeve unit, a plug unit, a plug guiding unit, and a coupling unit. The coupling unit includes a coupling seat, a coupling ring, and a coupling cover movable between a locked position and a released position. When the coupling cover is at the locked position, the optical fiber plug is locked to the optical fiber socket by the coupling ring. When the coupling cover is moved from the locked position to the released position, the coupling ring is urged resiliently by the coupling cover to release the optical fiber plug, thereby permitting separation of the optical fiber plug from the optical fiber socket.

8 Claims, 8 Drawing Sheets

OPTICAL FIBER SOCKET AND OPTICAL FIBER PLUG

CROSS-REFERENCE TO RELATED APPLICATION

This application claims priority of Taiwanese Patent Application No. 105202551, filed on Feb. 24, 2016.

FIELD

The disclosure relates to an optical fiber coupling device, and more particularly to a multi-core optical fiber coupling device.

BACKGROUND

Figure 1:
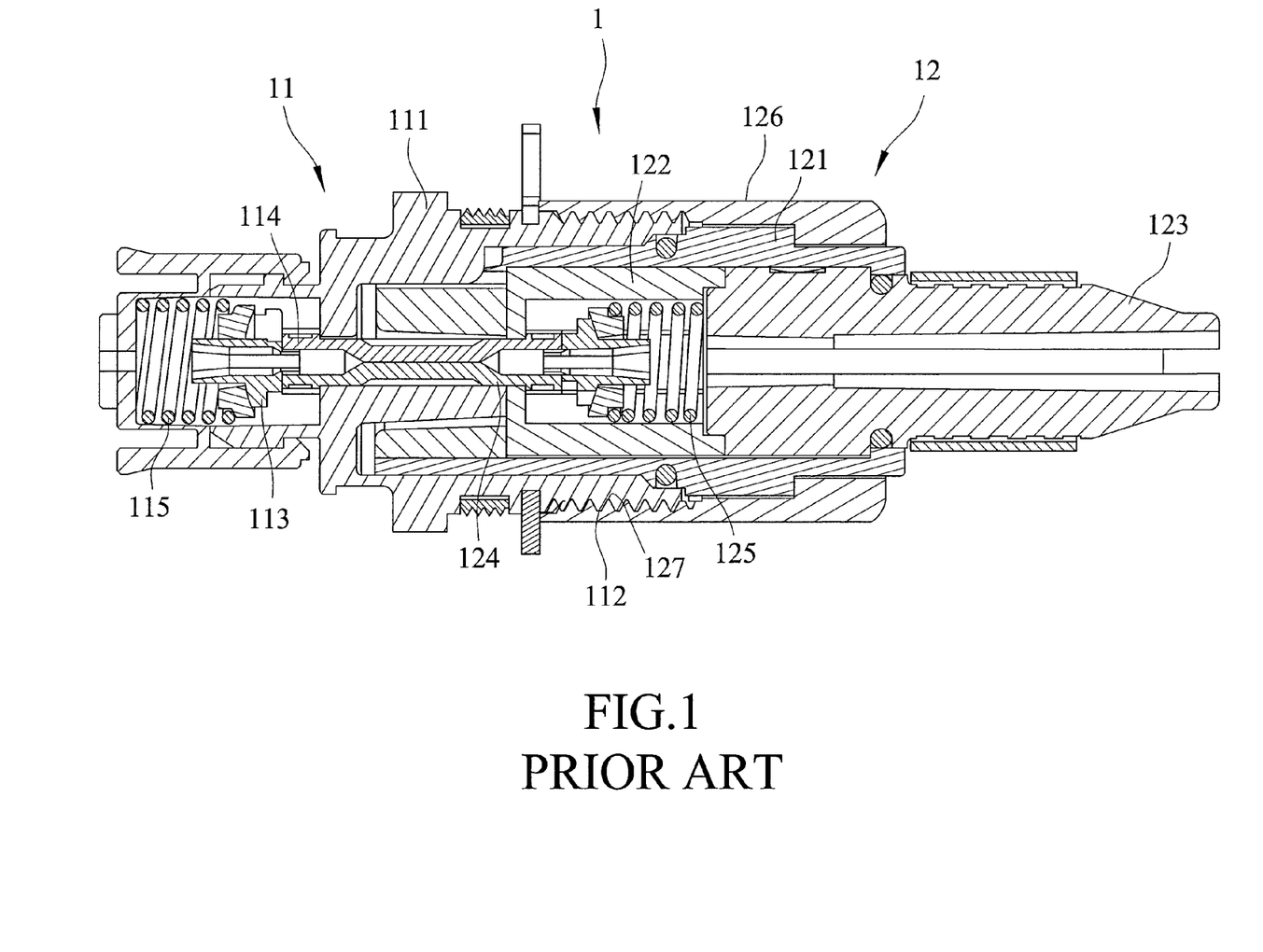
FIG. 1 is a sectional view of a conventional optical fiber coupling device disclosed in U.S. Pat. No. 7,654,747B2.

As shown in FIG. 1, a conventional optical fiber coupling device 1 disclosed in U.S. Pat. No. 7,654,747B2 includes a multi-fiber optical fiber socket 11 and a multi-fiber optical fiber plug 12 connected to the optical fiber socket 11.

The optical fiber socket 11 includes a socket shell 111 formed with an outer thread 112, a ferrule boot 113 fixedly connected to the socket shell 111, a receptacle ferrule 114 extending through and exposed toward the socket shell 111, and a socket resilient member 115 having two ends that respectively abut against the ferrule boot 113 and the receptacle ferrule 114.

The optical fiber plug 12 includes an outer shell 121, a plug head 122 disposed in the outer shell 121 and disposed for connection with the socket shell 111 of the optical fiber socket 11, a tail tube 123 disposed in the outer shell 121 and connected to a rear end portion of the plug head 122, a plug ferrule 124 disposed in and exposed from the socket head 122, a plug resilient member 125 having two ends that respectively abut against the plug ferrule 124 and the tail tube 123, and a coupling sleeve 126 sleeved on the outer shell 121 and formed with an inner thread 127 that is threadedly coupled to the outer thread 112.

By way of the outer thread 112 and the inner thread 127, the optical fiber socket 11 can be firmly connected to the optical fiber plug 12. However, a user needs to rotate the coupling sleeve 126 for connecting/disconnecting the optical fiber socket 11 to/from the optical fiber plug 12, leading to a time-consuming and an inconvenient operation.

SUMMARY

Therefore, an object of the disclosure is to provide an optical fiber plug that can be swiftly connected to an optical fiber socket.

According to the disclosure, the optical fiber plug is adapted to be connected to an optical fiber socket and a first optical fiber cable. The optical fiber plug includes a plug sleeve unit adapted to be sleeved on the first optical fiber cable, a plug unit connected to the plug sleeve unit and adapted for insertion of the first optical fiber cable thereinto, a plug guiding unit fixedly disposed in the plug unit, exposed toward the plug unit, and adapted to be connected to the first optical fiber cable, and a coupling unit. The coupling unit includes a coupling seat sleeved on the plug unit, a coupling ring disposed in the coupling seat, and a coupling cover sleeved on the coupling seat and movable between a locked position and a released position. When the optical fiber plug is connected to the optical fiber socket, the coupling cover is at the locked position, and the optical fiber plug is locked to the optical fiber socket by the coupling ring. When the coupling cover is moved from the locked position to the released position, the coupling ring is urged resiliently by the coupling cover to release the optical fiber plug, thereby permitting separation of the optical fiber plug from the optical fiber socket.

Another object of the disclosure is to provide an optical fiber socket that can be swiftly connected to the above-mentioned optical fiber plug.

According to the disclosure, the optical fiber socket is adapted to be connected to the optical fiber plug and a second optical fiber cable, and includes a socket sleeve unit adapted to be sleeved on the second optical fiber cable, a socket shell having a surrounding wall that is connected to the socket sleeve unit, and that defines a connecting hole adapted for insertion of the second optical fiber cable thereinto and to be engaged with the optical fiber plug, and an annular connecting groove that is formed in the surrounding wall, and a socket guiding unit. The socket guiding unit is disposed fixedly in the socket sleeve unit and the socket shell, exposed toward the socket shell, and adapted to be connected to the second optical fiber cable. When the coupling cover of the coupling unit of the optical fiber plug is at the locked position, the coupling ring is received by the connecting groove of the socket shell to lock the optical fiber plug to the optical fiber socket. When the coupling cover is at the released position, the coupling ring is urged resiliently by the coupling cover to be separated from the connecting groove, thereby permitting separation of the optical fiber plug from the optical fiber socket.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Referring to FIGS. 2 to 8, the exemplary embodiment of an optical fiber coupling device according to the present disclosure includes an optical fiber socket 2 and an optical fiber plug 3. The optical fiber plug 3 is connected to the optical fiber socket 2 and is adapted to be connected to a first optical fiber cable 200.

Figure 4:
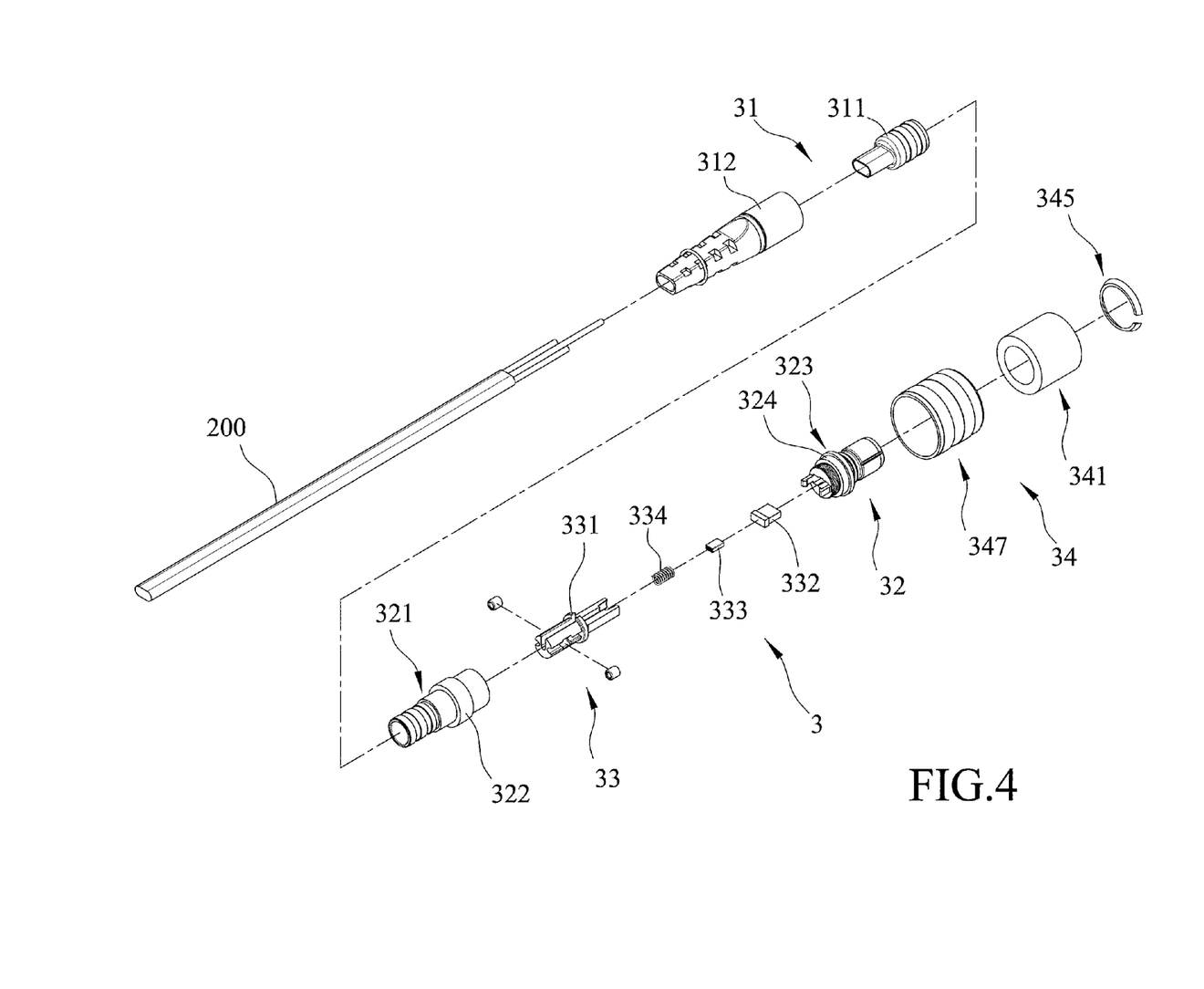
FIG. 4 is an exploded perspective view of an optical fiber plug of the exemplary embodiment.
Figure 5:
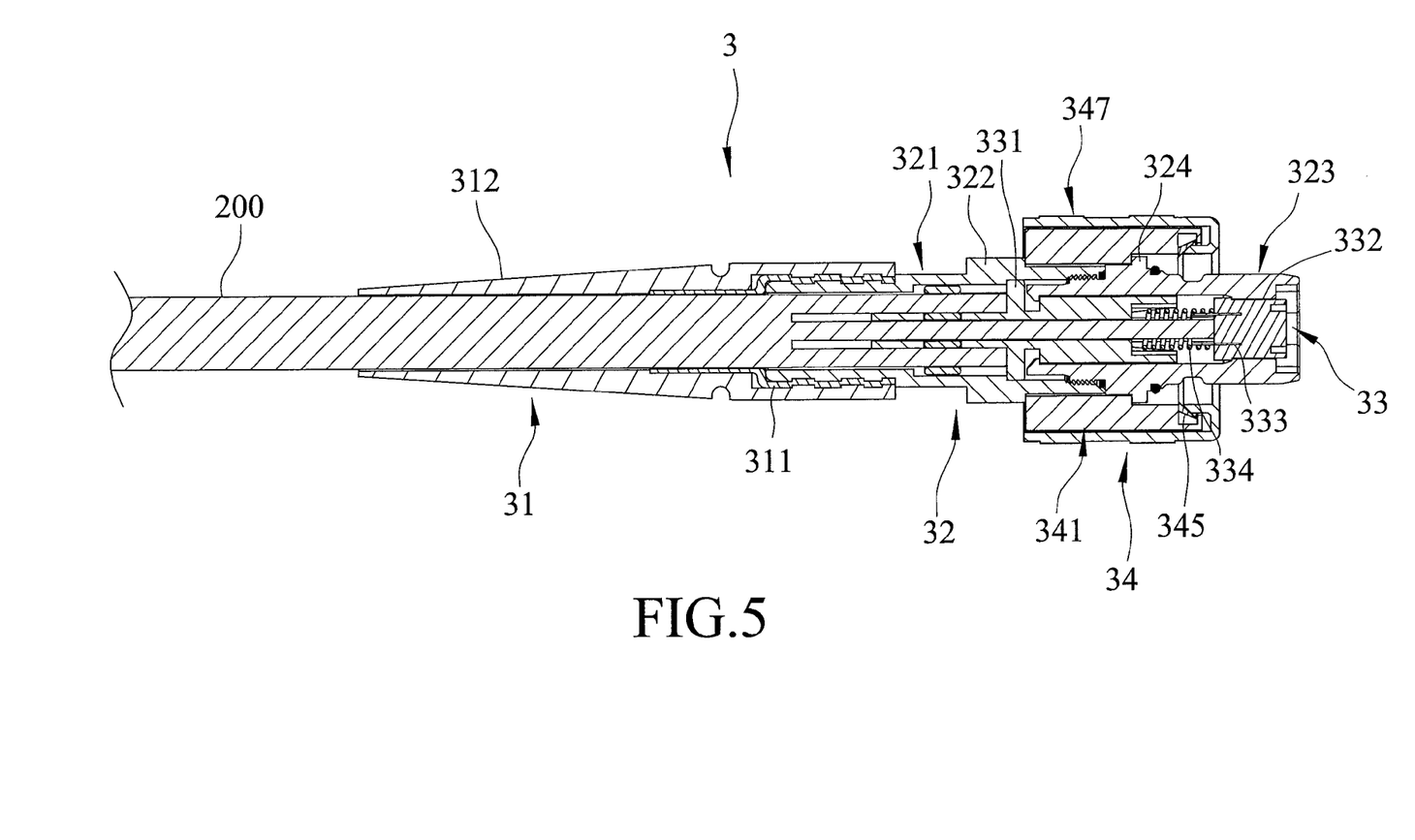
FIG. 5 is a fragmentary sectional view of the optical fiber plug of the exemplary embodiment.

As illustrated in FIGS. 4 and 5, the optical fiber plug 3 may include a plug sleeve unit 31, a plug unit 32, a plug guiding unit 33, and a coupling unit 34. The plug sleeve unit 31 is adapted to be sleeved on the first optical fiber cable

200. The plug unit 32 is connected to the plug sleeve unit 31 and is adapted for insertion of the first optical fiber cable 200 thereinto. The plug guiding unit 33 is fixedly disposed in the plug unit 32, is exposed toward the plug unit 32, and is adapted to be connected to the first optical fiber cable 200.

As shown in FIGS. 4 and 5, the plug sleeve unit 31 of this embodiment includes a plug tail tube 311 connected to the plug unit 32, and a plug tail cover 312 connected to an end of the plug tail tube 311 which is opposite to the plug unit 32.

As shown in FIGS. 4 and 5, the plug unit 32 of this embodiment includes a plug shell 321 connected to the plug tail tube 311 of the plug sleeve unit 31, and a plug head 323 threadedly connected to the plug shell 321. The plug shell 321 has a shell flange 322, and the plug head 323 has a head flange 324 spaced apart from the shell flange 322.

As shown in FIGS. 4 and 5, the plug guiding unit 33 of this embodiment includes a first connecting member 331, a first ferrule 332, a first guiding tube 333, and a first resilient member 334. The first connecting member 331 is connected fixedly between the plug shell 321 and the plug head 323 of the plug unit 32, and is adapted for insertion of the first optical fiber cable 200 therethrough. The first ferrule 332 is exposed from the plug head 323 of the plug unit 32, and is adapted to be connected to the optical fiber cable 200. The first guiding tube 333 has a portion penetrating into the first ferrule 332 from an end surface which faces the first connecting member 331, and an opposite portion adapted to surround the first optical fiber cable 200. The first resilient member 334 has two ends respectively abutting against the first ferrule 332 and the first connecting member 331 for biasing the first ferrule 332 away from the first connecting member 331.

Figure 6:
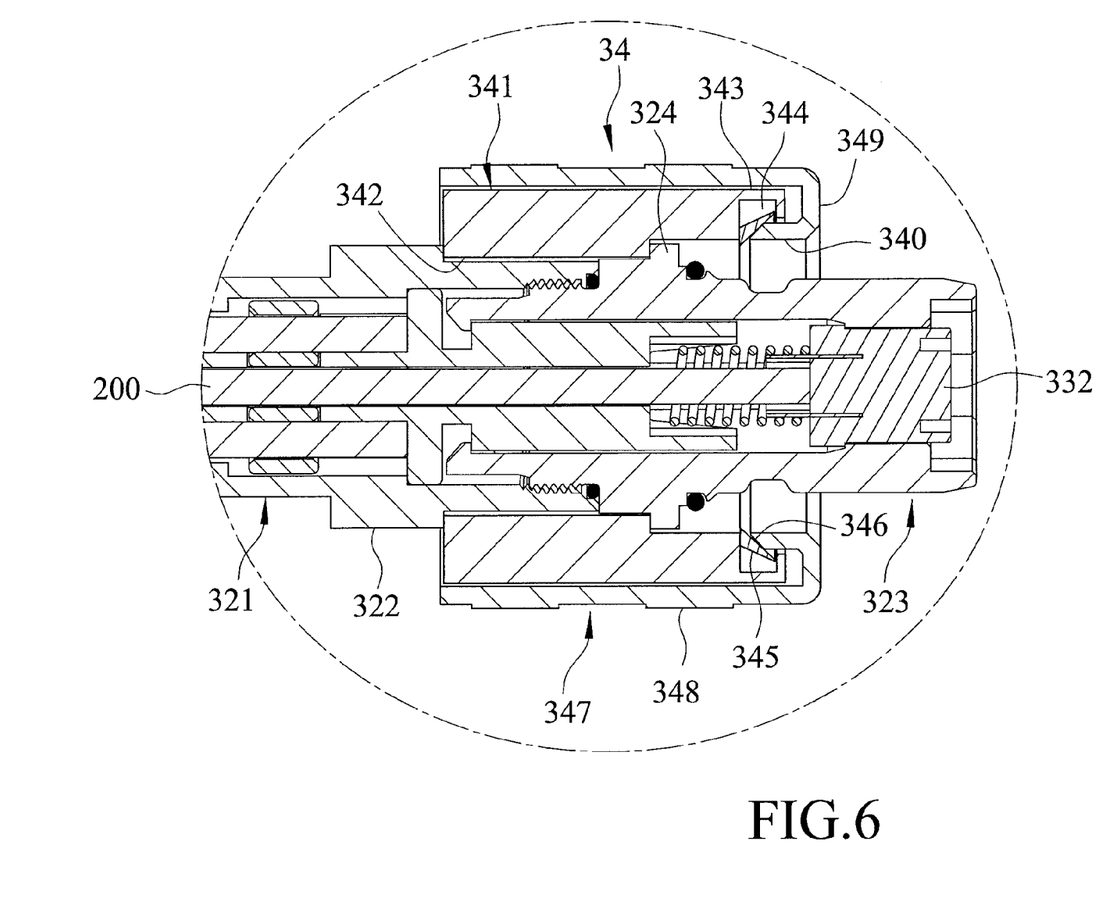
FIG. 6 is a fragmentary enlarged view of the optical fiber plug of the exemplary embodiment.

As shown in FIGS. 5 and 6, the coupling unit 34 of this embodiment includes a coupling seat 341 sleeved on the plug unit 32, a coupling ring 345 disposed in the coupling seat 341, and a coupling cover 347 sleeved on the coupling seat 341 and movable between a locked position and a released position. The coupling seat 341 has a main body portion 342 disposed between the shell flange 322 and the head flange 324, and a ring-retaining portion 343 extending from an end of the main body portion 342 opposite to the shell flange 322 of the plug unit 32. The ring-retaining portion 343 is formed with an inner groove 344 for receiving the coupling ring 345.

As shown in FIGS. 5 and 6, the coupling cover 347 has an outer wall 348 surrounding the main body portion 342 and the ring-retaining portion 343 of the coupling seat 341, a linking wall 349 extending inwardly from the outer wall 348 and spaced apart from the ring-retaining portion 343 of the coupling seat 341, and a blocking wall 340 extending from the linking wall 349 and abutting against the coupling ring 345. The outer wall 348, the linking wall 349 and the blocking wall 340 are formed as one piece in this embodiment.

As shown in FIGS. 5 and 6, the coupling ring 345 has an inclined surface 346, and a distance between the inclined surface 346 and the outer wall 348 decreases toward the linking wall 349. The blocking wall 340 abuts slidably against the inclined surface 346. In this embodiment, the coupling ring 345 is a C-ring as shown in FIG. 4.

Figure 2:
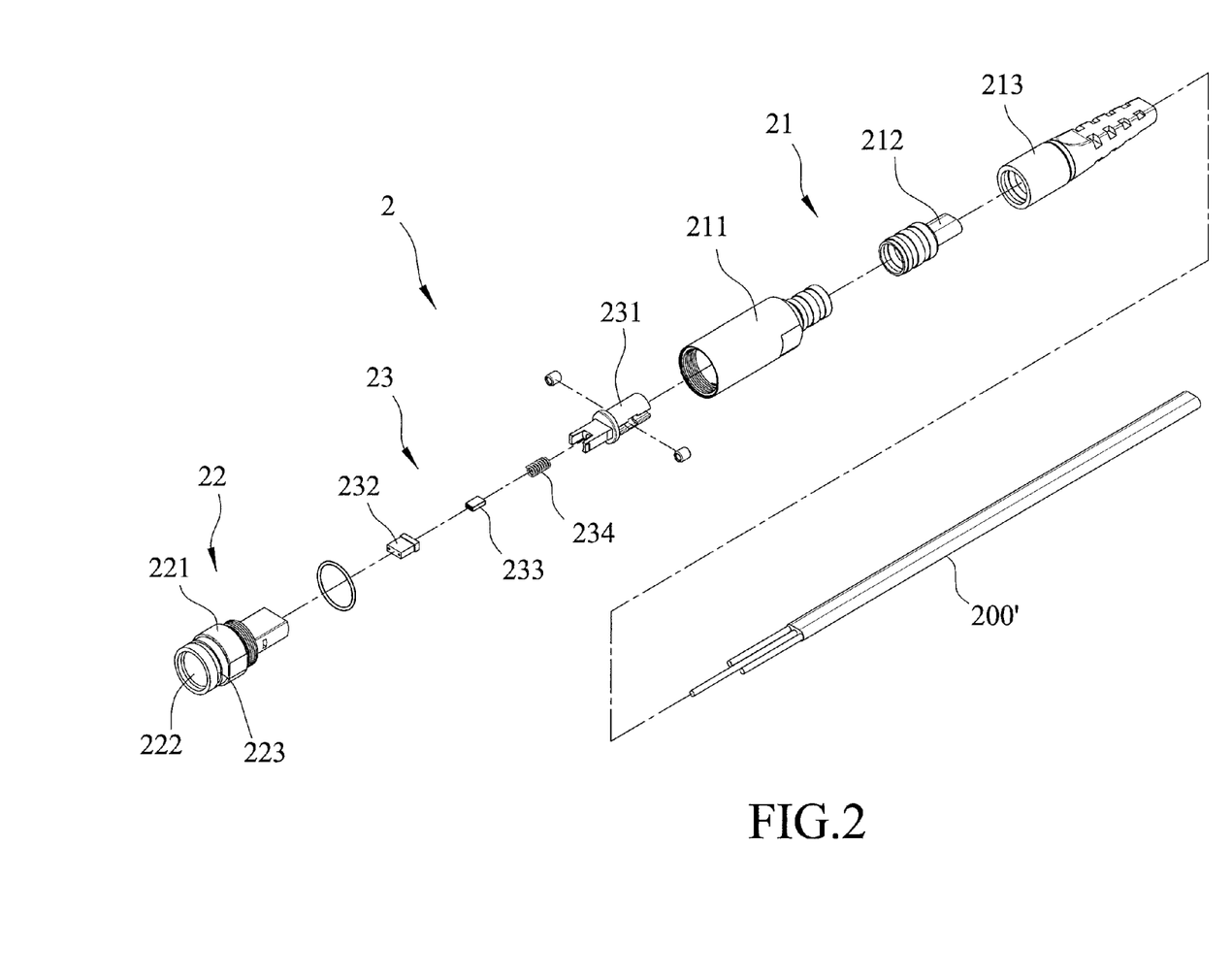
FIG. 2 is an exploded perspective view of an optical fiber socket of an exemplary embodiment of an optical fiber coupling device according to the disclosure.
Figure 3:
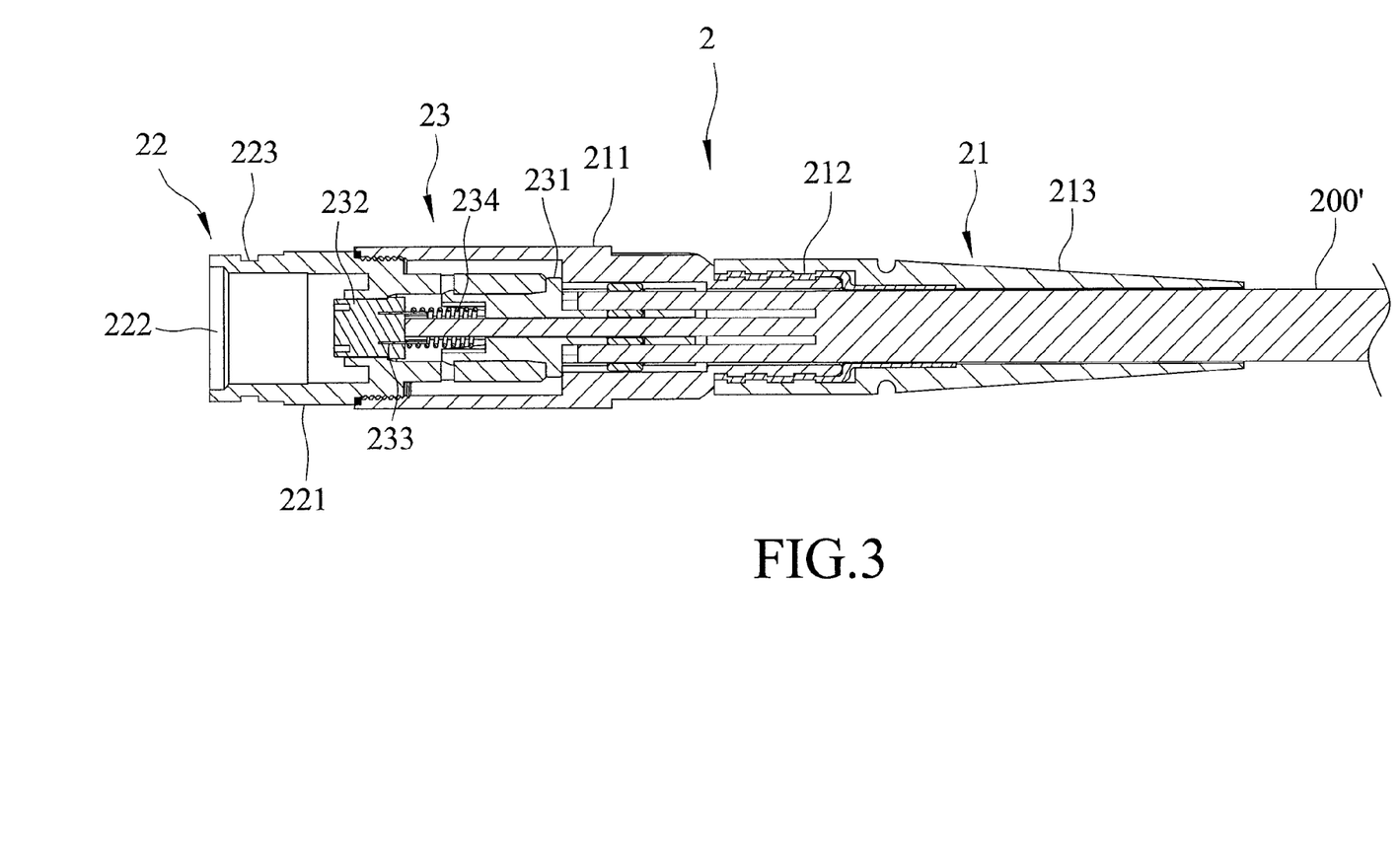
FIG. 3 is a fragmentary sectional view of the optical fiber socket of the exemplary embodiment.

As shown in FIGS. 2 and 3, the optical fiber socket 2 is connected to the optical fiber plug 3 and is adapted to be connected to a second optical fiber cable 200'. The optical fiber socket 2 may include a socket sleeve unit 21 adapted to be sleeved on the second optical fiber cable 200', a socket shell 22 connected to the socket sleeve unit 21, and a socket guiding unit 23 disposed fixedly in the socket sleeve unit 21 and the socket shell 22, exposed toward the socket shell 22, and adapted to be connected to the second optical fiber cable 200'.

As shown in FIGS. 2 and 3, the socket sleeve unit 21 of this embodiment includes an outer sleeve 211 threadedly connected to the socket shell 22, a socket tail tube 212 connected to an end portion of the outer sleeve 211 which is opposite to the socket shell 22, and a socket tail cover 213 sleeved on the socket tail tube 212.

As shown in FIGS. 2 and 3, the socket shell 22 of this embodiment has a surrounding wall 221 threadedly connected to the outer sleeve 211 of the socket sleeve unit 21, and defining a connecting hole 222 that is adapted for insertion of the second optical fiber cable 200' thereinto and that is to be engaged with the optical fiber plug 3, and an annular connecting groove 223 formed in the surrounding wall 221.

As shown in FIGS. 2 and 3, the socket guiding unit 23 of this embodiment includes a second connecting member 231, a second ferrule 232, a second guiding tube 233, and a second resilient member 234. The second connecting member 231 is connected fixedly between the outer sleeve 211 and the socket shell 22, and is adapted for insertion of the second optical fiber cable 200' therethrough. The second ferrule 232 is exposed toward the connecting hole 222, and is adapted to be connected to the second optical fiber cable 200'. The second guiding tube 233 has a portion penetrating into the second ferrule 232 from an end surface which faces the second connecting member 231, and an opposite portion adapted to surround the second optical fiber cable 200'. The second resilient member 234 has two ends respectively abutting against the second ferrule 232 and the second connecting member 231 for biasing the second ferrule 232 away from the second connecting member 231.

In this embodiment, the second optical fiber cable 200', to which the second connecting member 231 is adapted to be connected, is a flat-type optical fiber. It should be noted that other types of the second optical fiber cable 200' may be adopted in other embodiments of the present disclosure.

Figure 7:
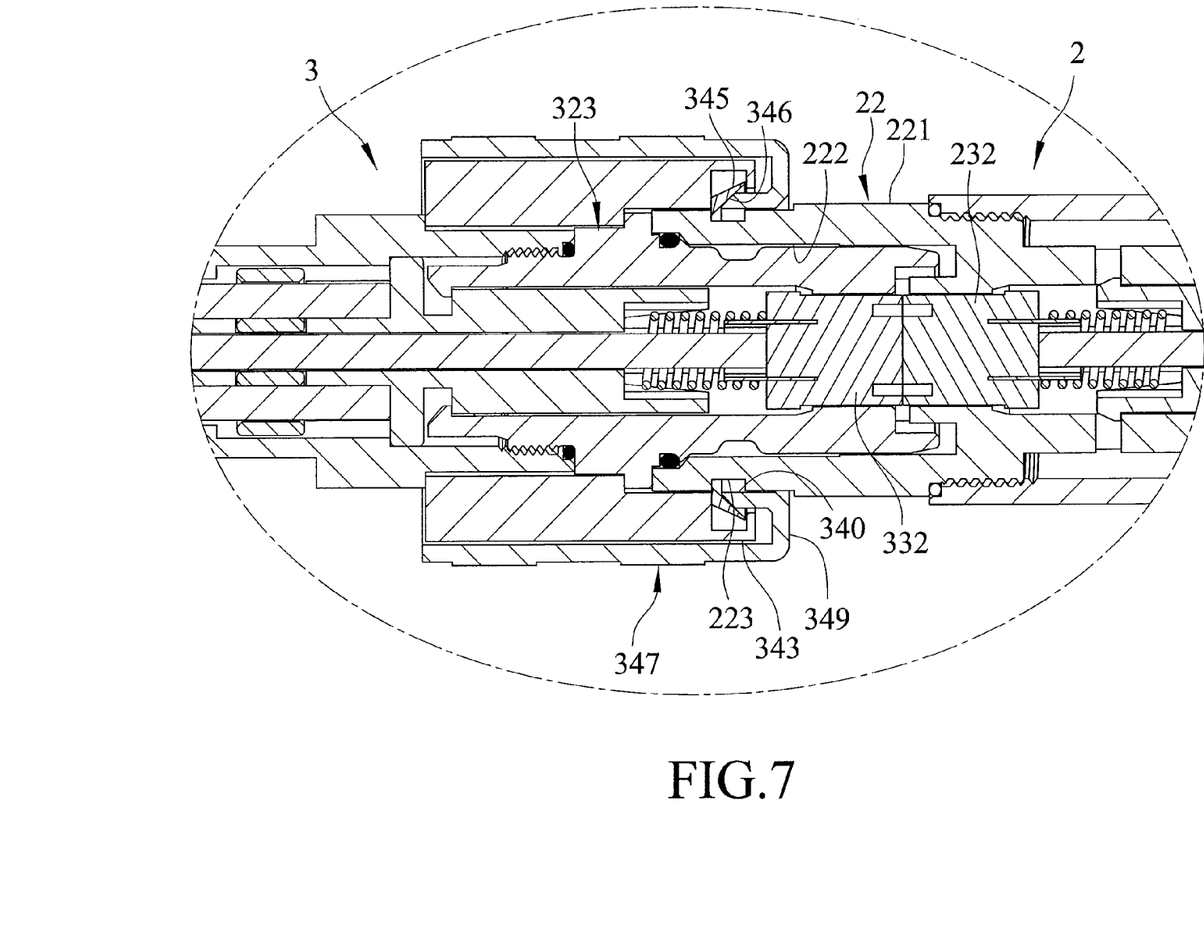
FIG. 7 is a fragmentary enlarged view illustrating that the optical fiber socket is connected to the optical fiber plug when the coupling cover is at a locked position.
Figure 8:
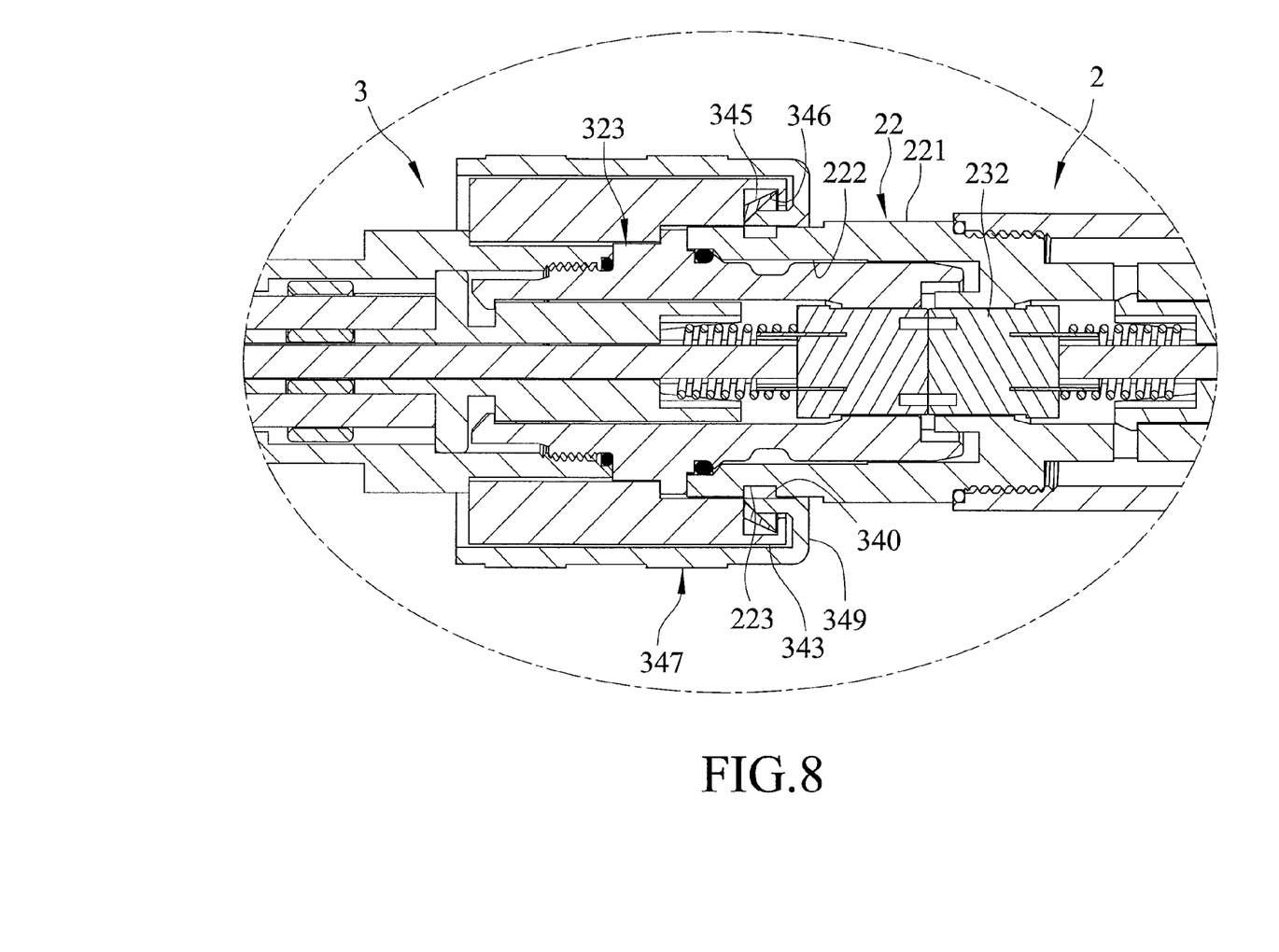
FIG. 8 is a view similar to FIG. 7 where the coupling cover is at a released position.

As shown in FIGS. 7 and 8, when connecting the optical fiber socket 2 with the optical fiber plug 3, the plug head 323 of the optical fiber plug 3 is inserted into the connecting hole 222 of the optical fiber socket 2, and the surrounding wall 221 of the socket shell 22 abuts against the inclined surface 346 of the coupling ring 345 to urge the coupling ring 345 to expand outwardly and resiliently, so that the plug head 323 of the optical fiber plug 3 can be smoothly inserted into the optical fiber socket 2. Thereafter, when the coupling ring 345 moves relative to the plug head 323 and reaches the connecting groove 223 as shown in FIG. 7, the coupling ring 345 engages with the connecting groove 223 of the socket shell 22 by its resilient restoring force and is received by the connecting groove 223 to securely lock the optical fiber plug 3 to the optical fiber socket 2, where the coupling cover 347 remains at the locked position.

When disconnecting the optical fiber plug 3 from the optical fiber socket 2, a user may only need to pull the coupling cover 347 from the locked position (see FIG. 7) to the released position (see FIG. 8), such that the blocking wall 340 of the coupling unit 34 is moved to be disposed between the coupling ring 345 and the connecting groove 223 of the socket shell 22 of the optical fiber socket 2. By such, the coupling ring 345 is urged resiliently by the blocking wall 340 of the coupling cover 347 to expand, and is then separated from the connecting groove 223 of the socket shell 22, thereby permitting separation of the optical fiber plug 3 from the optical fiber socket.

In conclusion, with such design, operations to connect and disconnect the optical fiber socket 2 and the optical fiber socket 3 can be time-efficient and relatively convenient.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber plug adapted to be connected to an optical fiber socket and a first optical fiber cable, said optical fiber plug comprising:
   a plug sleeve unit adapted to be sleeved on the first optical fiber cable;
   a plug unit connected to said plug sleeve unit and adapted for insertion of the first optical fiber cable thereinto;
   a plug guiding unit fixedly disposed in said plug unit, exposed toward said plug unit, and adapted to be connected to the first optical fiber cable; and
   a coupling unit including a coupling seat that is sleeved on said plug unit, a coupling ring that is disposed in said coupling seat, and a coupling cover that is sleeved on said coupling seat and that is movable between a locked position and a released position;
   wherein, when said optical fiber plug is connected to the optical fiber socket, said coupling cover is at the locked position, and said optical fiber plug is locked to the optical fiber socket by said coupling ring; and
   wherein, when said coupling cover is moved from the locked position to the released position, said coupling ring is urged resiliently by said coupling cover to release said optical fiber plug, thereby permitting separation of said optical fiber plug from the optical fiber socket.

2. The optical fiber plug as claimed in claim 1, wherein:
   said plug unit includes a plug shell connected to said plug sleeve unit, and a plug head threadedly connected to said plug shell;
   said plug shell has a shell flange, and said plug head has a head flange spaced apart from said shell flange;
   said coupling seat of said coupling unit has
   a main body portion disposed between said shell flange and said head flange, and a ring-retaining portion extending from an end of said main body portion opposite to said shell flange of said plug unit, and formed with an inner groove that is for receiving said coupling ring;
   said coupling cover of said coupling unit has an outer wall surrounding said main body portion and said ring-retaining portion of said coupling seat, a linking wall extending inwardly from said outer wall and spaced apart from said ring-retaining portion of said coupling seat, and a blocking wall extending from said linking wall and abutting against said coupling ring; and
   said outer wall, said linking wall and said blocking wall are formed as one piece.

3. The optical fiber plug as claimed in claim 2, wherein said coupling ring has an inclined surface, a distance between said inclined surface and said outer wall decreasing toward said linking wall, said blocking wall abutting slidably against said inclined surface.

4. The optical fiber plug as claimed in claim 2, wherein said plug guiding unit includes
   a plug connecting member connected fixedly between said plug shell and said plug head of said plug unit, and adapted for insertion of the first optical fiber cable therethrough,
   a plug ferrule exposed from said plug head of said plug unit, and adapted to be connected to the first optical fiber cable,
   a plug guiding tube having a portion that penetrates into said plug ferrule from an end surface which faces said plug connecting member, and an opposite portion that is adapted to surround the first optical fiber cable, and
   a plug resilient member having two ends that respectively abut against said plug ferrule and said plug connecting member for biasing said first plug ferrule away from said plug connecting member.

5. The optical fiber plug as claimed in claim 1, wherein said coupling ring of said coupling unit is a C-ring.

6. An optical fiber socket adapted to be connected to said optical fiber plug as claimed in claim 1 and a second optical fiber cable, said optical fiber socket comprising:
   a socket sleeve unit adapted to be sleeved on the second optical fiber cable;
   a socket shell having
   a surrounding wall that is threadedly connected to said socket sleeve unit, and that defines a connecting hole adapted for insertion of the second optical fiber cable thereinto and to be engaged with said optical fiber plug, and
   an annular connecting groove that is formed in said surrounding wall; and
   a socket guiding unit disposed fixedly in said socket sleeve unit and said socket shell, exposed toward said socket shell, and adapted to be connected to the second optical fiber cable;
   wherein, when said coupling cover of said coupling unit of said optical fiber plug is at the locked position, said coupling ring is received by said connecting groove of said socket shell to lock said optical fiber plug to said optical fiber socket; and
   wherein, when said coupling cover is at the released position, said coupling ring is urged resiliently by said coupling cover to be separated from said connecting groove, thereby permitting separation of said optical fiber plug from said optical fiber socket.

7. The optical fiber socket as claimed in claim 6, wherein:
   said socket sleeve unit includes an outer sleeve threadedly connected to said socket shell; and
   said socket guiding unit includes
   a socket connecting member connected fixedly between said outer sleeve and said socket shell, and adapted for insertion of the second optical fiber cable therethrough, a socket ferrule exposed toward said connecting hole, and adapted to be connected to the second optical fiber cable, a socket guiding tube having a portion that penetrates into said socket ferrule from an end surface which faces said socket connecting member, and an opposite portion that is adapted to surround the second optical fiber cable, and a socket resilient member having two ends that respectively abut against said socket ferrule and said socket connecting member for biasing said socket ferrule away from said socket connecting member.

8. The optical fiber socket as claimed in claim 6, wherein said coupling cover of said coupling unit of said optical fiber plug has a blocking wall that abuts against said coupling ring, and that is disposed between said coupling ring and said connecting groove of said socket shell of said optical fiber socket when said coupling seat of said coupling unit of said optical fiber plug is at the released position.

\* \* \* \* \*